United States Patent
Radi et al.

(10) Patent No.: US 12,301,690 B2
(45) Date of Patent: May 13, 2025

(54) ALLOCATION OF DISTRIBUTED CACHE

(71) Applicant: Western Digital Technologies, Inc., San Jose, CA (US)

(72) Inventors: Marjan Radi, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/331,453

(22) Filed: May 26, 2021

(65) Prior Publication Data
US 2022/0385732 A1 Dec. 1, 2022

(51) Int. Cl.
*H04L 67/568* (2022.01)
*H04L 43/028* (2022.01)

(52) U.S. Cl.
CPC .......... *H04L 67/568* (2022.05); *H04L 43/028* (2013.01)

(58) Field of Classification Search
CPC .......................... H04L 67/2842; H04L 43/028
USPC ....................................................... 709/223
See application file for complete search history.

(56) References Cited

U.S. PATENT DOCUMENTS

| | | | |
|---|---|---|---|
| 6,044,438 A | 3/2000 | Olnowich | |
| 6,078,997 A | 6/2000 | Young et al. | |
| 6,108,737 A | 8/2000 | Sharma et al. | |
| 6,209,065 B1 | 3/2001 | Van Doren et al. | |
| 6,230,243 B1 | 5/2001 | Elko et al. | |
| 6,263,404 B1 | 7/2001 | Borkenhagen et al. | |
| 6,298,418 B1 | 10/2001 | Fujiwara et al. | |
| 6,343,346 B1 | 1/2002 | Olnowich | |
| 6,775,804 B1 | 8/2004 | Dawson | |
| 6,829,683 B1 | 12/2004 | Kuskin | |
| 6,868,439 B2 | 3/2005 | Basu et al. | |
| 6,954,844 B2 | 10/2005 | Lentz et al. | |
| 6,993,630 B1 | 1/2006 | Williams et al. | |

(Continued)

FOREIGN PATENT DOCUMENTS

KR 102163279 B1 10/2020

OTHER PUBLICATIONS

Marjan Radi et al., "OmniXtend: direct to caches over commodity fabric", in 2019 IEEE Symposium on High-Performance Interconnects (HOTI), Santa Clara, CA, USA, Aug. 2019 pp. 59-62. (Year: 2019).*

(Continued)

*Primary Examiner* — Christopher B Robinson
*Assistant Examiner* — Chong G Kim
(74) *Attorney, Agent, or Firm* — Barry IP Law, P.C.

(57) ABSTRACT

A programmable switch includes ports to communicate with nodes including at least one node providing a cache accessible by other nodes. The programmable switch inspects received packets to identify information related to the cache. One or more cache metrics are determined for the cache based on the identified information and at least a portion of the cache is allocated to at least one application executed by at least one of the nodes based on the one or more cache metrics. According to one aspect, a distributed cache is formed of caches stored at nodes. The network controller stores distributed cache metrics and receives cache metrics from programmable switches for the caches to update the distributed cache metrics. Portions of the distributed cache are allocated to different applications based on the updated distributed cache metrics.

20 Claims, 4 Drawing Sheets

| App. ID | Allocation | W-R Ratio | Bandwidth | Hit Rate | Priority |
|---|---|---|---|---|---|
| 1 | a – f | 64% | 4 MB/s | 13% | A |
| 2 | g – m | 1.9% | 124 GB/s | 40% | B |
| 3 | n – q | 96% | 80 KB/s | 98% | A |
| 4 | r – u | 22% | 500 MB/s | 87% | C |

(56) References Cited

U.S. PATENT DOCUMENTS

| | | |
|---|---|---|
| 7,032,078 B2 | 4/2006 | Cypher et al. |
| 7,376,799 B2 | 5/2008 | Veazey et al. |
| 7,673,090 B2 | 3/2010 | Kaushik et al. |
| 7,716,425 B1 | 5/2010 | Uysal et al. |
| 7,975,025 B1 | 7/2011 | Szabo et al. |
| 8,166,251 B2 | 4/2012 | Luttrell |
| 8,281,075 B2 | 10/2012 | Arimilli et al. |
| 9,088,592 B1 | 7/2015 | Craft et al. |
| 9,313,604 B1 | 4/2016 | Holcombe |
| 9,442,850 B1 | 9/2016 | Rangarajan et al. |
| 9,467,380 B2 | 10/2016 | Hong et al. |
| 9,712,381 B1 | 7/2017 | Emanuel et al. |
| 9,819,739 B2 | 11/2017 | Hussain et al. |
| 9,825,862 B2 | 11/2017 | Bosshart |
| 9,826,071 B2 | 11/2017 | Bosshart |
| 9,880,768 B2 * | 1/2018 | Bosshart ............ H04L 45/74 |
| 9,910,615 B2 | 3/2018 | Bosshart |
| 9,912,610 B2 | 3/2018 | Bosshart et al. |
| 9,923,816 B2 | 3/2018 | Kim et al. |
| 9,936,024 B2 | 4/2018 | Malwankar et al. |
| 9,940,056 B2 | 4/2018 | Bosshart |
| 10,038,624 B1 | 7/2018 | Cruz et al. |
| 10,044,583 B2 | 8/2018 | Kim et al. |
| 10,050,854 B1 | 8/2018 | Licking et al. |
| 10,063,407 B1 | 8/2018 | Kodeboyina et al. |
| 10,063,479 B2 | 8/2018 | Kim et al. |
| 10,063,638 B2 | 8/2018 | Huang |
| 10,067,967 B1 | 9/2018 | Bosshart |
| 10,075,567 B1 | 9/2018 | Licking et al. |
| 10,078,463 B1 | 9/2018 | Bosshart |
| 10,084,687 B1 | 9/2018 | Sharif et al. |
| 10,110,454 B2 | 10/2018 | Kim et al. |
| 10,127,983 B1 | 11/2018 | Peterson et al. |
| 10,133,499 B2 | 11/2018 | Bosshart |
| 10,146,527 B2 | 12/2018 | Olarig et al. |
| 10,158,573 B1 * | 12/2018 | Lee ............ H04L 47/125 |
| 10,164,829 B1 | 12/2018 | Watson et al. |
| 10,169,108 B2 | 1/2019 | Gou et al. |
| 10,225,381 B1 | 3/2019 | Bosshart |
| 10,230,810 B1 | 3/2019 | Bhide et al. |
| 10,237,206 B1 | 3/2019 | Agrawal et al. |
| 10,257,122 B1 | 4/2019 | Li et al. |
| 10,268,634 B1 | 4/2019 | Bosshart et al. |
| 10,298,456 B1 | 5/2019 | Chang |
| 10,496,566 B2 | 12/2019 | Olarig et al. |
| 10,503,679 B2 | 12/2019 | Huang |
| 10,628,353 B2 | 4/2020 | Prabhakar et al. |
| 10,635,316 B2 | 4/2020 | Singh et al. |
| 10,742,557 B1 * | 8/2020 | Miriyala ............ H04L 49/70 |
| 10,761,995 B2 | 9/2020 | Blaner et al. |
| 10,812,388 B2 | 10/2020 | Thubert et al. |
| 10,880,204 B1 | 12/2020 | Shalev et al. |
| 2003/0009637 A1 | 1/2003 | Arimilli et al. |
| 2003/0028819 A1 | 2/2003 | Chiu et al. |
| 2003/0158999 A1 | 8/2003 | Hauck et al. |
| 2004/0044850 A1 | 3/2004 | George et al. |
| 2004/0073699 A1 | 4/2004 | Hong et al. |
| 2004/0260883 A1 | 12/2004 | Wallin et al. |
| 2005/0058149 A1 | 3/2005 | Howe |
| 2006/0265568 A1 | 11/2006 | Burton |
| 2006/0271598 A1 | 11/2006 | Wong et al. |
| 2007/0067382 A1 | 3/2007 | Sun |
| 2008/0010409 A1 | 1/2008 | Rao et al. |
| 2009/0213850 A1 | 8/2009 | Viger et al. |
| 2009/0240664 A1 | 9/2009 | Dinker et al. |
| 2009/0240869 A1 | 9/2009 | O'Krafka et al. |
| 2009/0313503 A1 | 12/2009 | Atluri et al. |
| 2010/0008260 A1 | 1/2010 | Kim et al. |
| 2010/0100604 A1 * | 4/2010 | Fujiwara ............ G06F 12/0866 709/213 |
| 2010/0223322 A1 | 9/2010 | Mott et al. |
| 2011/0004729 A1 | 1/2011 | Akkawi et al. |
| 2011/0093925 A1 | 4/2011 | Krishnamoorthy et al. |
| 2011/0238923 A1 | 9/2011 | Hooker et al. |
| 2012/0110108 A1 | 5/2012 | Li et al. |
| 2012/0155264 A1 | 6/2012 | Sharma et al. |
| 2013/0054897 A1 * | 2/2013 | Flemming ............ G06F 12/0888 711/E12.024 |
| 2013/0145008 A1 * | 6/2013 | Kannan .................. H04L 45/74 709/223 |
| 2013/0254325 A1 | 9/2013 | Song et al. |
| 2013/0263249 A1 | 10/2013 | Song et al. |
| 2014/0219284 A1 | 8/2014 | Chau et al. |
| 2014/0241361 A1 * | 8/2014 | Bosshart ................ H04L 45/74 370/392 |
| 2014/0269413 A1 | 9/2014 | Hui et al. |
| 2014/0269716 A1 | 9/2014 | Pruss et al. |
| 2014/0278575 A1 | 9/2014 | Anton et al. |
| 2014/0331001 A1 | 11/2014 | Liu et al. |
| 2014/0362709 A1 | 12/2014 | Kashyap et al. |
| 2015/0120859 A1 * | 4/2015 | Kondo .................. G06F 15/167 709/213 |
| 2015/0195216 A1 | 7/2015 | Di Pietro et al. |
| 2015/0301949 A1 | 10/2015 | Koka et al. |
| 2015/0319243 A1 | 11/2015 | Hussain et al. |
| 2015/0378919 A1 | 12/2015 | Anantaraman et al. |
| 2016/0050150 A1 | 2/2016 | Venkatesan et al. |
| 2016/0099872 A1 | 4/2016 | Kim et al. |
| 2016/0112514 A1 * | 4/2016 | Prakash Usgaonkar ..................... H04L 45/306 709/217 |
| 2016/0124652 A1 * | 5/2016 | Adamson ............ G06F 16/217 711/171 |
| 2016/0127492 A1 | 5/2016 | Malwankar et al. |
| 2016/0134531 A1 * | 5/2016 | Assarpour ............... H04L 45/38 370/392 |
| 2016/0156558 A1 | 6/2016 | Hong et al. |
| 2016/0216913 A1 | 7/2016 | Bosshart |
| 2016/0246507 A1 | 8/2016 | Bosshart |
| 2016/0246535 A1 | 8/2016 | Bosshart |
| 2016/0294451 A1 | 10/2016 | Jung et al. |
| 2016/0315964 A1 | 10/2016 | Shetty et al. |
| 2016/0323189 A1 | 11/2016 | Ahn et al. |
| 2017/0026292 A1 | 1/2017 | Smith et al. |
| 2017/0054618 A1 | 2/2017 | Kim |
| 2017/0054619 A1 | 2/2017 | Kim |
| 2017/0063690 A1 | 3/2017 | Bosshart |
| 2017/0064047 A1 | 3/2017 | Bosshart |
| 2017/0093707 A1 | 3/2017 | Kim et al. |
| 2017/0093986 A1 | 3/2017 | Kim et al. |
| 2017/0093987 A1 | 3/2017 | Kaushalram et al. |
| 2017/0187846 A1 | 6/2017 | Shalev et al. |
| 2017/0214599 A1 | 7/2017 | Seo et al. |
| 2017/0277477 A1 * | 9/2017 | Xi ............ G06F 3/064 |
| 2017/0286363 A1 | 10/2017 | Joshua et al. |
| 2017/0310594 A1 * | 10/2017 | Kotha .................. H04L 45/741 |
| 2017/0371790 A1 | 12/2017 | Dwiel et al. |
| 2018/0034740 A1 | 2/2018 | Beliveau et al. |
| 2018/0060136 A1 | 3/2018 | Herdrich et al. |
| 2018/0167319 A1 * | 6/2018 | Qian ............ H04L 69/22 |
| 2018/0167352 A1 | 6/2018 | Worley et al. |
| 2018/0173448 A1 | 6/2018 | Bosshart |
| 2018/0176324 A1 | 6/2018 | Kumar et al. |
| 2018/0234340 A1 | 8/2018 | Kim et al. |
| 2018/0234355 A1 | 8/2018 | Kim et al. |
| 2018/0239551 A1 | 8/2018 | Bosshart |
| 2018/0242191 A1 | 8/2018 | Lundqvist et al. |
| 2018/0260135 A1 | 9/2018 | Hayashida et al. |
| 2018/0260330 A1 | 9/2018 | Felter et al. |
| 2018/0262459 A1 | 9/2018 | Wang et al. |
| 2018/0285275 A1 | 10/2018 | Barczak et al. |
| 2018/0329818 A1 | 11/2018 | Cheng et al. |
| 2018/0335953 A1 | 11/2018 | Ramaswamy et al. |
| 2018/0337860 A1 | 11/2018 | Kim et al. |
| 2018/0349163 A1 | 12/2018 | Gao et al. |
| 2018/0349285 A1 | 12/2018 | Ish et al. |
| 2019/0012278 A1 | 1/2019 | Sindhu et al. |
| 2019/0018774 A1 * | 1/2019 | Birke .................. G06F 11/34 |
| 2019/0042138 A1 * | 2/2019 | Guim Bernat ........ G06F 3/0647 |
| 2019/0044878 A1 | 2/2019 | Steffen et al. |
| 2019/0050333 A1 | 2/2019 | Chacon et al. |
| 2019/0058646 A1 | 2/2019 | Kim et al. |
| 2019/0087341 A1 | 3/2019 | Pugsley et al. |

(56) References Cited

U.S. PATENT DOCUMENTS

| | | |
|---|---|---|
| 2019/0146675 A1 | 5/2019 | Subramanian et al. |
| 2019/0146907 A1 | 5/2019 | Frolikov |
| 2019/0196987 A1 | 6/2019 | Shen et al. |
| 2019/0220429 A1 | 7/2019 | Ranjan et al. |
| 2019/0227921 A1 | 7/2019 | Frolikov |
| 2019/0342785 A1 | 11/2019 | Li et al. |
| 2019/0354402 A1 | 11/2019 | Bivens et al. |
| 2019/0370176 A1 | 12/2019 | Priyadarshi et al. |
| 2019/0391928 A1 | 12/2019 | Lin |
| 2019/0394261 A1 | 12/2019 | DeCusatis et al. |
| 2020/0007408 A1 | 1/2020 | Siddappa |
| 2020/0050402 A1 | 2/2020 | Furey et al. |
| 2020/0065269 A1 | 2/2020 | Balasubramani et al. |
| 2020/0068014 A1 | 2/2020 | Sarkar et al. |
| 2020/0089619 A1 | 3/2020 | Hsu et al. |
| 2020/0097212 A1 | 3/2020 | Lakshman et al. |
| 2020/0151104 A1 | 5/2020 | Yang |
| 2020/0213156 A1 | 7/2020 | Cheng et al. |
| 2020/0226068 A1 | 7/2020 | Gellerich et al. |
| 2020/0233823 A1 | 7/2020 | Zhang |
| 2020/0250099 A1 | 8/2020 | Campbell et al. |
| 2020/0259763 A1* | 8/2020 | Guim Bernat ...... H04L 43/0852 |
| 2020/0293499 A1 | 9/2020 | Kohli et al. |
| 2020/0313999 A1* | 10/2020 | Lee ................ H04L 43/0847 |
| 2020/0322287 A1* | 10/2020 | Connor ............. H04L 67/1097 |
| 2020/0349080 A1 | 11/2020 | Radi et al. |
| 2020/0351370 A1* | 11/2020 | Radi .................. G06F 12/0828 |
| 2020/0379668 A1 | 12/2020 | Akaike et al. |
| 2020/0379922 A1* | 12/2020 | Kumar ............... G06F 12/0646 |
| 2021/0034250 A1 | 2/2021 | Mizuno et al. |
| 2021/0034270 A1 | 2/2021 | Gupta et al. |
| 2021/0049078 A1 | 2/2021 | Khan et al. |
| 2021/0051751 A1 | 2/2021 | Pawar |
| 2021/0073086 A1 | 3/2021 | Subraya et al. |
| 2021/0141910 A1 | 5/2021 | Numata |
| 2021/0149807 A1 | 5/2021 | Gupta et al. |
| 2021/0173589 A1 | 6/2021 | Benisty et al. |
| 2021/0194828 A1 | 6/2021 | He et al. |
| 2021/0218623 A1 | 7/2021 | Jain et al. |
| 2021/0247935 A1 | 8/2021 | Beygi et al. |
| 2021/0266219 A1* | 8/2021 | Kim ...................... H03M 13/09 |
| 2021/0286540 A1 | 9/2021 | Tylik et al. |
| 2021/0286546 A1* | 9/2021 | Hodgson ............. G06F 12/0246 |
| 2021/0294506 A1 | 9/2021 | Tadokoro |
| 2021/0294702 A1* | 9/2021 | Guim Bernat ...... G06F 11/1469 |
| 2021/0311899 A1 | 10/2021 | Smith et al. |
| 2021/0318828 A1 | 10/2021 | Valtonen |
| 2022/0197819 A1* | 6/2022 | Kumar .................. G06F 12/109 |
| 2022/0210220 A1* | 6/2022 | Shivanna ............ H04L 67/1008 |

OTHER PUBLICATIONS

Ming Liu et al., "IncBricks: toward in-network computation with an in-network cache", ASPLOS '17: Proceedings of the Twenty-Second International Conference on Architectural Support for Programming Languages and Operating Systems, Apr. 2017 pp. 795-809 (Year: 2017).*

Xin Jin et al., "Netcache: balancing key-value stores with fast in-network caching", SOSP '17: Proceedings of the 26th Symposium on Operating Systems Principles, Oct. 2017, pp. 121-136 (Year: 2017).*

Zaoxing Liu et al., "DistCache: provable load balancing for large-scale storage systems with distributed caching", FAST'19: Proceedings of the 17th USENIX Conference on File and Storage Technologies, Feb. 2019, pp. 143-157 (Year: 2019).*

Qing Wang et al., "Concordia: Distributed Shared Memory with In-Network Cache Coherence", 19th USENIX Conference on File and Storage Technologies, pp. 277-292, Feb. 2021 (Year: 2021).*

Jin et al., NetCache: Balancing Key-Value Stores with Fast In-Network Caching, SOSP '17: Proceedings of the 26th Symposium on Operating Systems Principles, Oct. 2017 pp. 121-136 (Year: 2017).*

Hashemi et al.; "Learning Memory Access Patters"; 15 pages; Mar. 6, 2018; available at https://arxiv.org/pdf/1803.02329.pdf.

Kim, et al.; "A Framework for Data Prefetching using Off-line Training of Markovian Predictors"; Sep. 18, 2002; 8 pages; available at https://www.comp.nus.edu.sg/~wongwf/papers/ICCD2002.pdf.

Cisco White Paper; "Intelligent Buffer Management on Cisco Nexus 9000 Series Switches"; Jun. 6, 2017; 22 pages; available at: https://www.cisco.com/c/en/us/products/collateral/switches/nexus-9000-series-switches/white-paper-c11-738488.html.

Pending U.S. Appl. No. 17,174,681, filed Feb. 12, 2021, entitled "Devices and Methods for Network Message Sequencing", Marjan Radi et al.

Pending U.S. Appl. No. 17,175,449, filed Feb. 12, 2021, entitled "Management of Non-Volatile Memory Express Nodes", Marjan Radi et al.

Written Opinion dated Feb. 20, 2020 from International Application No. PCT/US2019/068360, 4 pages.

Botelho et al.; "On the Design of Practical Fault-Tolerant SDN Controllers"; Sep. 2014; 6 pages; available at: http://www.di.fc.ul.pt/~bessani/publications/ewsdn14-ftcontroller.pdf.

Huynh Tu Dang; "Consensus Protocols Exploiting Network Programmability"; Mar. 2019; 154 pages; available at: https://doc.rero.ch/record/324312/files/2019INFO003.pdf.

Jialin Li; "Co-Designing Distributed Systems with Programmable Network Hardware"; 2019; 205 pages; available at: https://digital.lib.washington.edu/researchworks/bitstream/handle/1773/44770/Li_washington_0250E_20677.pdf?sequence=1&isAllowed=y.

Liu et al.; "Circuit Switching Under the Radar with REACTOR"; Apr. 2-4, 2014; 16 pages; USENIX; available at: https://www.usenix.org/system/files/conference/nsdi14/nsdi14-paper-liu_he.pdf.

International Search Report and Written Opinion dated Apr. 27, 2020 from counterpart International Application No. PCT/US2019/068269, 6 pages.

Leslie Lamport; "Paxos Made Simple"; Nov. 1, 2001; available at: https://lamport.azurewebsites.net/pubs/paxos-simple.pdf.

Paul Krzyzanowski; "Understanding Paxos"; PK.org; Distributed Systems; Nov. 1, 2018; available at: https://www.cs.rutgers.edu/~pxk/417/notes/paxos.html.

Wikipedia; Paxos (computer science); accessed on Jun. 27, 2020; available at: https://en.wikipedia.org/wiki/Paxos_(computer_science).

Pending U.S. Appl. No. 16/916,730, filed Jun. 30, 2020, entitled "Devices and Methods for Failure Detection and Recovery for a Distributed Cache", Radi et al.

Ivan Pepelnjak; Introduction to 802.1Qbb (Priority-based Flow Control-PFC); accessed on Jun. 25, 2020; available at: https://gestaltit.com/syndicated/ivan/introduction-802-1qbb-priority-based-flow-control-pfc/.

Juniper Networks Inc.; Configuring Priority-Based Flow Control for an EX Series Switch (CLI Procedure); Sep. 25, 2019; available at: https://www.juniper.net/documentation/en_US/junos/topics/task/configuration/cos-priority-flow-control-cli-ex-series.html.

Pending U.S. Appl. No. 16/914,206, filed Jun. 26, 2020, entitled "Devices and Methods for Managing Network Traffic for a Distributed Cache", Radi et al.

Eisley et al.; "In-Network Cache Coherence"; 2006; pp. 321-332; Proceedings of the 39th Annual IEEE/ACM International Symposium on Microarchitecture.

Jin et al.; "NetCache: Balancing Key-Value Stores with Fast In-Network Caching"; Oct. 28, 2017; pp. 121-136; Proceedings of the 26th Symposium on Operating Systems Principles.

Li et al.; "Pegasus: Load-Aware Selective Replication with an In-Network Coherence Directory"; Dec. 2018; 15 pages; Technical Report UW-CSE-18-12-01, University of Washington CSE, Seattle, WA.

Liu et al.; "IncBricks: Toward In-Network Computation with an In-Network Cache"; Apr. 2017; pp. 795-809; ACM SIGOPS Operating Systems Review 51, Jul. 26, No. 2.

Pending U.S. Appl. No. 16/697,019, filed Nov. 26, 2019, entitled "Fault Tolerant Data Coherence in Large-Scale Distributed Cache Systems", Marjan Radi et al.

(56) References Cited

OTHER PUBLICATIONS

Vestin et al.; "FastReact: In-Network Control and Caching for Industrial Control Networks using Programmable Data Planes"; Aug. 21, 2018; pp. 219-226; IEEE 23rd International Conference on Emerging Technologies and Factory Automation (ETFA). vol. 1.

Stefanovici et al.; "Software-Defined Caching: Managing Caches in Multi-Tenant Data Centers"; Aug. 2015; pp. 174-181; SoCC '15: Proceedings of the Sixth ACM Symposium on Cloud Computing; available at: http://dx.doi.org/10.1145/2806777.2806933.

Mahmood et al.; "Efficient Caching through Stateful SDN in Named Data Networking"; Dec. 14, 2017; Transactions on Emerging Telecommunications Technologies; vol. 29, issue 1; available at: https://onlinelibrary.wiley.com/doi/abs/10.1002/ett.3271.

Liu et al.; "DistCache: Provable Load Balancing for Large-Scale Storage Systems with Distributed Caching"; Feb. 2019; Proceedings of the 17th USENIX Conference on File and Storage Technologies; available at: https://www.usenix.org/conference/fast19/presentation/liu.

Pending U.S. Appl. No. 16/548, 116, filed Aug. 22, 2019, entitled "Distributed Cache With In-Network Prefetch", Marjan Radi et al.

Ibrar et al.; "PrePass-Flow: A Machine Learning based Technique to Minimize ACL Policy Violation Due to Links Failure in Hybrid SDN"; Nov. 20, 2020; Computer Networks; available at https://doi.org/10.1016/j.comnet.2020.107706.

Saif et al.; "IOscope: A Flexible I/O Tracer for Workloads' I/O Pattern Characterization"; Jan. 25, 2019; International Conference on High Performance Computing; available at https://doi.org/10.1007/978-3-030-02465-9_7.

Zhang et al.; "PreFix Switch Failure Prediction in Datacenter Networks"; Mar. 2018; Proceedings of the ACM on the Measurement and Analysis of Computing Systems; available at: https://doi.org/10.1145/3179405.

Pending U.S. Appl. No. 17/353,781, filed Jun. 21, 2021, entitled "In-Network Failure Indication and Recovery", Marjan Radi et al.

International Search Report and Written Opinion dated Oct. 28, 2021 from International Application No. PCT/US2021/039070, 7 pages.

International Search Report and Written Opinion dated Jun. 1, 2022 from International Application No. PCT/US2022/017608, 7 pages.

Intel Corporation; "In-Band Network Telemetry Detects Network Performance Issues"; White Paper, Dec. 18, 2020; available at: https://builders.intel.com/docs/networkbuilders/in-band-network-telemetry-detects-network-performance-issues.pdf.

International Search Report and Written Opinion dated Jul. 7, 2022 from International Application No. PCT/US2022/017633, 10 pages.

Sabella et al.; "Using eBPF for network traffic analysis"; available at: Year: 2018; https://www.ntop.org/wp-content/uploads/2018/10/Sabella.pdf.

\* cited by examiner

| App. ID | Allocation | W-R Ratio | Bandwidth | Hit Rate | Priority |
|---|---|---|---|---|---|
| 1 | a – f | 64% | 4 MB/s | 13% | A |
| 2 | g - m | 1.9% | 124 GB/s | 40% | B |
| 3 | n - q | 96% | 80 KB/s | 98% | A |
| 4 | r - u | 22% | 500 MB/s | 87% | C |

ALLOCATION OF DISTRIBUTED CACHE

CROSS-REFERENCE TO RELATED APPLICATIONS

This application is related to U.S. application Ser. No. 16/548,116 titled "DISTRIBUTED CACHE WITH IN-NETWORK PREFETCH", filed on Aug. 22, 2019, and published as U.S. Patent Application Publication No. 2020/0349080 on Nov. 5, 2020, which is hereby incorporated by reference in its entirety. This application is also related to U.S. application Ser. No. 16/697,019 titled "FAULT TOLERANT DATA COHERENCE IN LARGE-SCALE DISTRIBUTED CACHE SYSTEMS", filed on Nov. 26, 2019, and published as U.S. Patent Application Publication No. 2020/0351370 on Nov. 5, 2020, which is hereby incorporated by reference in its entirety. This application is also related to U.S. application Ser. No. 16/914,206 titled "DEVICES AND METHODS FOR MANAGING NETWORK TRAFFIC FOR A DISTRIBUTED CACHE", filed on Jun. 26, 2020, which is hereby incorporated by reference in its entirety. This application is also related to U.S. application Ser. No. 16/916,730 titled "DEVICES AND METHODS FOR FAILURE DETECTION AND RECOVERY FOR A DISTRIBUTED CACHE", filed on Jun. 30, 2020, which is hereby incorporated by reference in its entirety. This application is also related to U.S. application Ser. No. 17/174,681, titled "DEVICES AND METHODS FOR NETWORK MESSAGE SEQUENCING", filed on Feb. 12, 2021, which is hereby incorporated by reference in its entirety. This application is also related to U.S. application Ser. No. 17/175,449, titled "MANAGEMENT OF NON-VOLATILE MEMORY EXPRESS NODES", filed on Feb. 12, 2021, which is hereby incorporated by reference in its entirety. This application is also related to U.S. application Ser. No. 17/353,781, titled "IN-NETWORK FAILURE INDICATION AND RECOVERY", filed on Jun. 21, 2021, which is hereby incorporated by reference in its entirety.

BACKGROUND

Current trends in cloud computing, big data, and Input/Output (I/O) intensive applications have led to greater needs for high performance distributed shared memory systems in data centers in terms of low latency, high throughput, and bandwidth. For example, artificial intelligence, graph processing, bioinformatics, and in-memory database applications typically use large data sets and can suffer in performance when data is not quickly accessible in a shared memory and must be loaded into the shared memory from storage. Data may be cached to reduce the latency for accessing the data but managing a distributed cache that is shared by nodes throughout a network presents several challenges.

Current distributed memory systems generally do not support a global coordination of distributed caches among different nodes, which negatively affects overall system performance. For example, different applications with diverse memory request rates that share the same cache memory can be negatively affected, such as where an application accessing the memory for large sequential reads blocks access to the cache memory by a different application. Existing cache management techniques may either over-provision the cache or need user adjustment before operation for the particular applications using the cache. In addition to requiring more memory for over-provisioning or more time for a user to initialize, these existing cache management techniques fail to accommodate for changing workloads during runtime since the cache size assigned to different applications at the initialization stage is fixed and cannot be adjusted during runtime according to their workloads.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Examples

Figure 1:
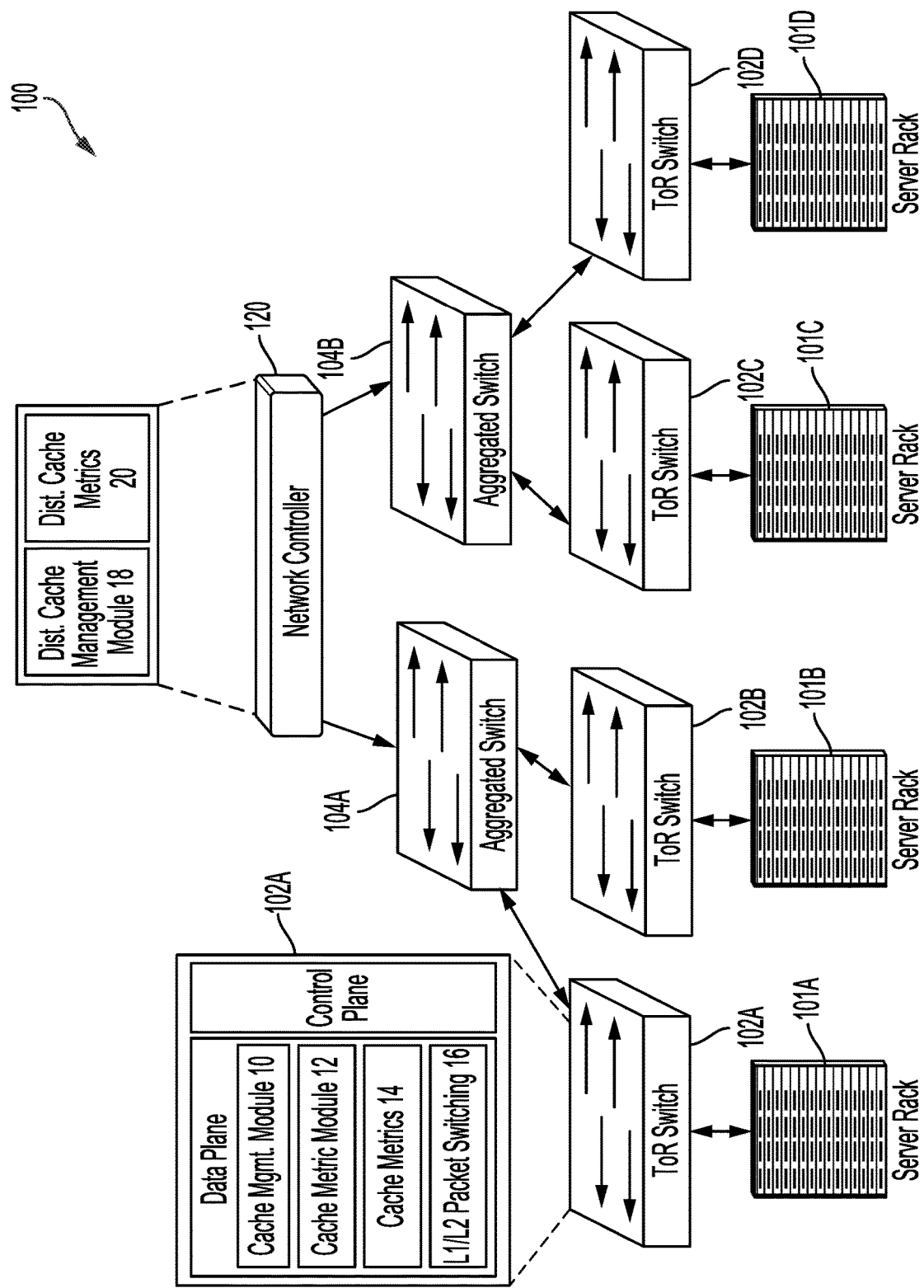
FIG. 1 illustrates an example network including nodes, programmable switches, and a network controller according to one or more embodiments.

FIG. 1 illustrates an example network 100 for implementing a distributed cache according to one or more embodiments. As shown in FIG. 1, server racks 101A, 101B, 101C, and 101D use Top of Rack (ToR) switches 102A, 102B, 102C, and 102D, respectively, to communicate with other devices in network 100. Each server rack 101 includes one or more nodes, such as node 108 in FIG. 2, that can access memory or storage locations in other nodes using messages, such as read and write commands. The nodes in server racks 101 can include, for example, servers or processing nodes, such as Reduced Instruction Set Computer (RISC)-V cores, and memory devices, such as Solid-State Drives (SSDs) or Hard Disk Drives (HDDs). In some implementations, network 100 in FIG. 1 may be used as at least part of a data center and/or for distributed processing, such as for distributed machine learning or big data analysis.

Network 100 can include, for example, a Storage Area Network (SAN), a Local Area Network (LAN), and/or a Wide Area Network (WAN), such as the Internet. In this regard, one or more of server racks 101, ToR switches 102, aggregated switches 104, and/or network controller 120 may not be physically co-located. Server racks 101, ToR switches 102, aggregated switches 104, and/or network controller 120 may communicate using one or more standards such as, for example, Ethernet.

As shown in the example of FIG. 1, each of server racks 101A, 101B, 101C, and 101D is connected to a ToR or edge switch 102. In other implementations, each rack 101 may communicate with multiple ToR or edge switches 102 for redundancy. ToR switches 102 can include programmable switches, such as 64 port ToR P4 programmable switches that route messages to and from nodes located in server racks 101. Such programmable switches can include, for example, a Barefoot Networks Tofino Application Specific Integrated Circuit (ASIC) with ports configured to provide 40 Gigabit Ethernet (GE) frame rates. Other types of programmable switches that can be used as a ToR switch 102 can include, for example, a Cavium Xpliant programmable switch or a Broadcom Trident 3 programmable switch. As discussed in more detail below, each ToR switch 102 can provide centralized cache allocation for the data stored in the end node devices of its respective server rack 101, such as for a distributed cache.

Aggregated switch 104A routes messages between ToR switches 102A and 102B, and between ToR switches 102A and 102B and network controller 120. Similarly, aggregated switch 104B routes messages between ToR switches 102C and 102D, and between ToR switches 102C and 102D and network controller 120. In this regard, server racks 101A and 101B with ToR switches 102A and 102B and aggregated switch 104A may be viewed as a first cluster of devices on network 100. Server racks 101C and 101D with ToR switches 102C and 102D and aggregated switch 104B may be viewed as a second cluster of devices on network 100.

Aggregated switches 104A and 104B can include programmable switches, such as 64 port ToR P4 programmable switches that route messages to and from ToR switches 102 and network controller 120. Such programmable switches can include, for example, a Barefoot Networks Tofino Application Specific Integrated Circuit (ASIC) with ports configured to provide 40 Gigabit Ethernet (GE) frame rates. Other types of programmable switches that can be used as an aggregated switch 104 can include, for example, a Cavium Xpliant programmable switch or a Broadcom Trident 3 programmable switch.

Network controller 120 can include a Software Defined Networking (SDN) controller. As discussed in more detail below, network controller 120 can store distributed cache metrics 20 for a distributed cache stored at different nodes in network 100. Distributed cache metrics 20 can be updated based on cache metrics received from programmable switches, such as ToR switches 102, and used by distributed cache management module 18 to allocate portions of the distributed cache to different applications accessing the distributed cache.

In this regard, ToR switches 102 are configured to inspect packets received by the ToR switch to identify information related to a portion of the distributed cache provided by at least one of the nodes in its respective server rack 101. The ToR switch can determine cache metrics 14 for the portion of the distributed cache using cache metric module 12 and allocate at least a portion of the cache to one or more applications or programs based on the determined cache metrics using cache management module 10. The cache metrics may include, for example, priorities associated with different applications, write-to-read ratios or read-to-write ratios for different applications accessing the cache, memory bandwidths for different applications accessing the cache, cache usage for different applications accessing the cache, and/or indications for cache hit rates or cache miss rates for different applications accessing the cache.

In some implementations, ToR switches 102 and aggregated switches 104 can include, for example, programmable switches that can be programmed to handle different custom protocols. Programmable switches 102 and 104 can include programmable match-action pipelines to provide a configurable data plane and customized packet processing capability with L1/L2 packet switching 16. Examples of such programmable switches can be found in co-pending U.S. application Ser. Nos. 17/174,681, 16/914,206, and 16/916,730, and U.S. Patent Application Publication Nos. 2020/0349080 and 2020/0351370, each of which are incorporated by reference above.

Data planes of programmable switches 102 and 104 in the example of FIG. 1 can control point-to-point packet forwarding behavior of the programmable switch, such as with L1/L2 Ethernet packet switching, packet admission control, and scheduling or queuing. Data planes of programmable switches 102 and 104 are programmable and separate from higher-level control planes that determine end-to-end routes for packets or messages between devices in network 100.

In some implementations, ToR switches 102 may serve as Non-Volatile Memory express (NVMe) controllers for NVMe nodes in their respective server racks 101. In such implementations, ToR switches 102 can update available namespaces in an NVMe mapping for the server rack and/or perform an NVMe discovery process to determine whether there are one or more newly available namespaces. Such implementations are discussed in more detail in co-pending U.S. application Ser. No. 17/175,449, which is incorporated by reference above.

In addition, the use of a programmable switches 102 and 104 can enable the configuration of high-performance and scalable memory centric architectures by defining customized packet formats and processing behavior. Programmable switches 102 and 104 enable a protocol-independent switch architecture and the use of off-the-shelf switches, as opposed to specially designed Networks on a Chip (NoCs). The processing resources of programmable switches 102 and 104, such as the use of Content Addressable Memory (CAM) or Ternary CAM (TCAM) tables, or other types of match-action tables, can ordinarily provide faster processing and deep packet inspection, such as inspection of NVMe messages within a packet, than can occur at the end nodes.

Those of ordinary skill in the art will appreciate with reference to the present disclosure that other implementations may include a different number or arrangement of server racks 101, ToR switches 102, and aggregated switches 104 than shown in the example of FIG. 1. In this regard, network 100 shown in FIG. 1 is for the purposes of illustration, and those of ordinary skill in the art will appreciate that network 100 may include many more server racks 101, switches or routers than shown in the example of FIG. 1. Other implementations may include additional levels in network 100 that may include core switches, additional servers and/or other programmable switches. In some variations, aggregated switches 104 may be omitted.

In addition, some implementations may include a different arrangement of modules, such as a single module executed by a ToR switch 102 for determining cache metrics and for allocating cache memory to different applications accessing the cache. In yet other implementations, cache metrics may be stored in different locations than those shown in FIG. 1, such as at a node within a server rack 101 instead of at a ToR switch 102.

Figure 2:
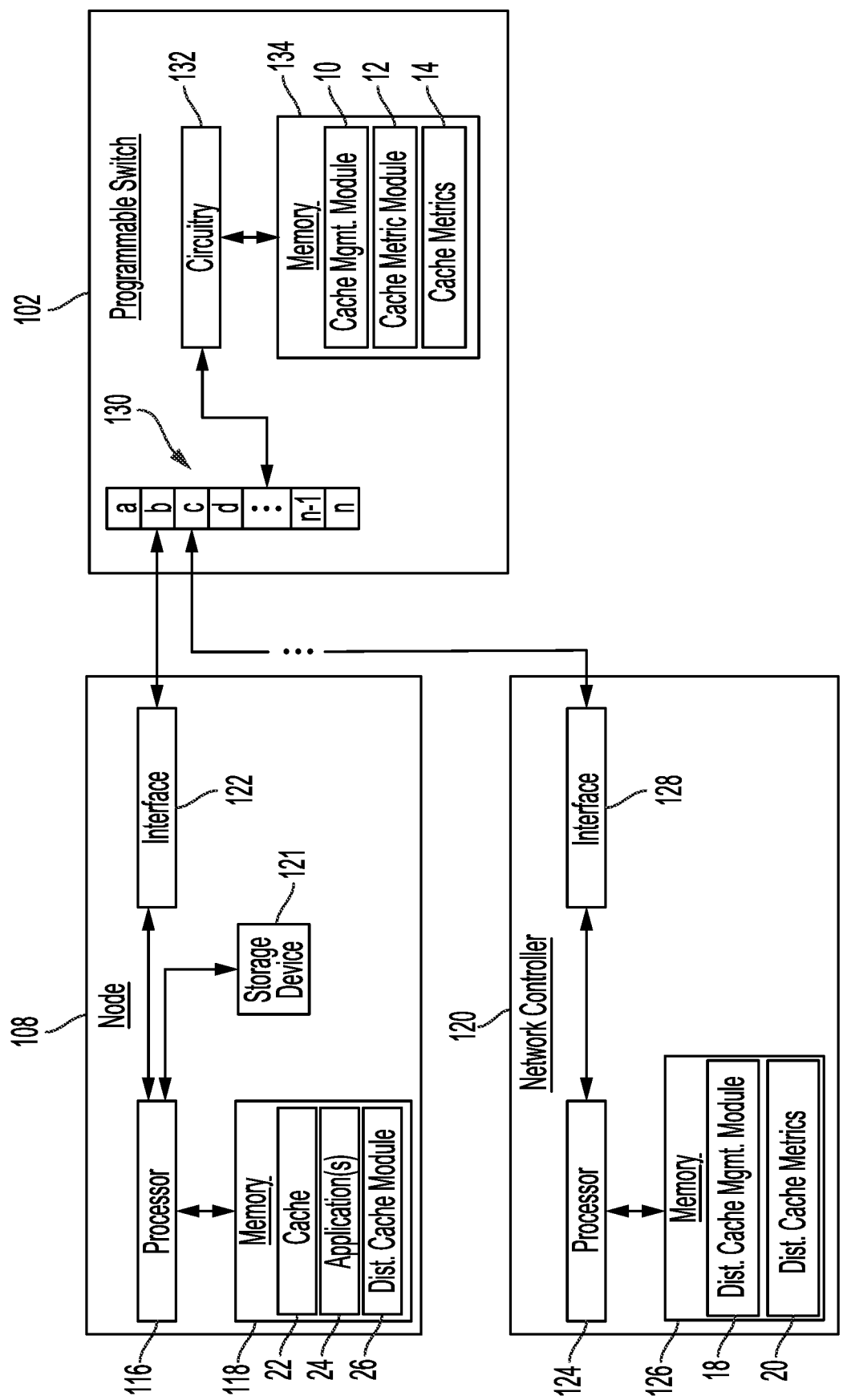
FIG. 2 is a block diagram of example components included in the network of FIG. 1 according to one or more embodiments.

FIG. 2 is a block diagram of example components included in network 100 of FIG. 1 according to one or more embodiments. As shown in FIG. 2, node 108 includes processor 116, memory 118, storage device 121, and interface 122 for communicating on network 100. Node 108 may be included as part of server rack 101A, for example, in FIG. 1. Although only node 108 is shown in the example of FIG. 2, other nodes in network 100 may have similar or different components as node 108.

Processor 116 can execute instructions, such as instructions from distributed cache module 26 and application(s) 24, which may include an Operating System (OS) and/or other applications used by node 108. Processor 116 can include circuitry such as a Central Processing Unit (CPU), one or more RISC-V cores, a Graphics Processing Unit (GPU), a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, processor 116 can include a System on a Chip (SoC), which may be combined with one or both of memory 118 and interface 122.

Memory 118 can include, for example, a volatile Random Access Memory (RAM) such as Static RAM (SRAM), Dynamic RAM (DRAM), a non-volatile RAM, or other solid-state memory that is used by processor 116 as an internal main memory to store data. Data stored in memory 118 can include data read from storage device 121, data to be stored in storage device 121, instructions loaded from distributed cache module 26 or application(s) 24 for execution by processor 116, and/or data used in executing such applications. In addition to loading data from memory 118, processor 116 may also load data from shared memory locations of other nodes as an external memory or distributed cache. Such data may also be flushed after modification by processor 116 or evicted without modification back to memory 118 or an external node via programmable switch 102.

As shown in FIG. 2, memory 118 stores distributed cache module 26, which can provide instructions for accessing data in a distributed cache. Such instructions can include a protocol for maintaining coherency of data (e.g., cache lines) stored on different nodes of network 100 and handling communications with programmable switch 102, such as for maintaining a proper sequence of messages. In some implementations, distributed cache module 26 can include a driver used by an OS of node 108.

Storage device 121 serves as secondary storage that can include, for example, one or more rotating magnetic disks or non-volatile solid-state memory, such as flash memory. While the description herein refers to solid-state memory generally, it is understood that solid-state memory may comprise one or more of various types of memory devices such as flash integrated circuits, NAND memory (e.g., single-level cell (SLC) memory, multi-level cell (MLC) memory (i.e., two or more levels), or any combination thereof), NOR memory, electrically erasable programmable read only memory (EEPROM), other discrete Non-Volatile Memory (NVM) chips, or any combination thereof.

Interface 122 is configured to interface node 108 with programmable switch 102. Interface 122 may communicate using a standard such as, for example, Ethernet. In this regard, node 108, programmable switch 102, and network controller 120 may not be physically co-located and may communicate over a network such as a LAN or a WAN. As will be appreciated by those of ordinary skill in the art, interface 122 can be included as part of processor 116.

As discussed above with reference to FIG. 1, programmable switch 102 can be a ToR switch for a server rack 101 including node 108. In the example of FIG. 2, programmable switch 102 includes ports 130, circuitry 132, and memory 134. Ports 130 provide a connection and are configured to communicate with devices, such as nodes, network controller 120, and aggregated switches 104. For example, ports 130 may include Ethernet ports.

Memory 134 of programmable switch 102 can include, for example, a volatile RAM such as DRAM, or a non-volatile RAM or other solid-state memory such as register arrays that are used by circuitry 132 to execute instructions loaded from cache management module 10, cache metric module 12, or firmware of programmable switch 102, and/or data used in executing such instructions, such as cache metrics 14. Circuitry 132 can include circuitry such as an ASIC, a microcontroller, a DSP, an FPGA, hard-wired logic, analog circuitry and/or a combination thereof. In some implementations, circuitry 132 can include an SoC, which may be combined with memory 134.

As discussed in more detail below, cache management module 10 and cache metric module 12 can include instructions for implementing processes such as those discussed with reference to FIGS. 4 and 5 to enable allocation and redistribution of cache memory among applications using the cache. In addition, the use of cache metrics 14 enables programmable switch 102 to update network controller 120 as to the use of cache 22 for allocation of a distributed cache, as discussed in more detail below with reference to the cache allocation process of FIG. 6. In this regard, network controller 120 can aggregate the cache memory from multiple nodes that may be in different server racks 101 and allocate usage of the aggregated cache memory among applications that may be executed at multiple nodes in different server racks 101.

Network controller 120 in the example of FIG. 2 maintains distributed cache metrics 20, which may include a table or other type of data structure, such as a Key Value Store (KVS). Controller 120 receives cache metrics updates or notifications from programmable switches 102 and/or 104 via interface 128 indicating updates or changes to the cache metrics maintained by the programmable switches 102, such as cache metrics 14. Such updates can include, for example, changes in the usage of a cache, such as a release of memory previously allocated to an application, or a new allocation of cache memory. Other updates can include changes in bandwidth, cache requirements, priorities for applications accessing a cache, or changes in other cache metrics such as hit rates or read-to-write ratios for different applications accessing the cache. In addition, network controller 120 may send one or more messages to programmable switches 102 to indicate adjustments to the allocation of cache memory located in respective server racks 101.

Processor 124 of network controller 120 executes distributed cache module 18 to maintain distributed cache metrics 20 and notify programmable switches 102 of adjustments, as needed. Processor 124 can include circuitry such as a CPU, a GPU, a microcontroller, a DSP, an ASIC, an FPGA, hard-wired logic, analog circuitry and/or a combination thereof. In some implementations, processor 124 can include an SoC, which may be combined with one or both of memory 126 and interface 128. Memory 126 can include, for example, a volatile RAM such as DRAM, a non-volatile RAM, or other solid-state memory that is used by processor 124 to store data. Network controller 120 communicates with programmable switches 102 via interface 128, which is configured to interface with ports of programmable switches 102, and may interface according to a standard, such as Ethernet.

As will be appreciated by those of ordinary skill in the art with reference to the present disclosure, other implementations may include a different arrangement or number of components, or modules than shown in the example of FIG. 2. For example, in some implementations, node 108 may not include storage device 121, or two programmable switches 102 may be used for a single server rack for redundancy. In addition, the arrangement shown for programmable switch 102 in FIG. 2 may also apply to aggregated switches 104 in some implementations.

Figures 3, 4:
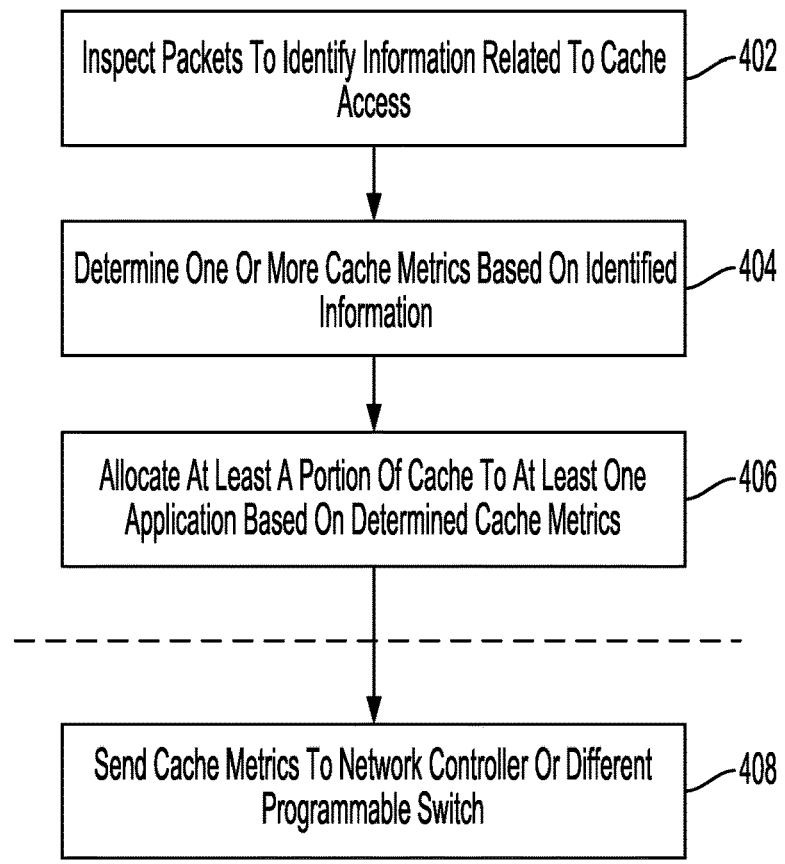
FIG. 3 illustrates example cache metrics according to one or more embodiments.
FIG. 4 is a flowchart for a cache allocation process performed by a programmable switch according to one or more embodiments.

FIG. 3 illustrates an example of cache metrics 14 according to one or more embodiments. In the example of FIG. 3, cache metrics 14 may be a table or other type of data structure like a KVS. For example, cache metrics 14 can include a single data structure or may be formed of multiple data structures stored at a programmable switch 102, which may include a memory directly connected to and used by programmable switch 102 (e.g., memory 134 in FIG. 2). Distributed cache metrics 20 stored by network controller 120 may include similar information as that shown for cache metrics 14 of FIG. 3, but with cache metrics for applications throughout network 100 using the distributed cache.

As shown in FIG. 3, cache metrics 14 includes application identifiers (i.e., App. IDs in FIG. 3) that identify different applications or programs that access one or more caches stored in the server rack corresponding to the ToR switch 102. In implementations where cache metrics are determined or stored by aggregated switches 104, the application identifiers can identify different applications or programs that access one or more caches in multiple server racks in a cluster corresponding to the aggregated switch 104. In some implementations, the programmable switches can identify the applications using a port number included in a User Datagram Protocol (UDP) header or Transmission Control Protocol (TCP) header that is used to indicate the application or program that originated a message sent to the programmable switch. The port number may be used in some implementations as the application identifier in cache metrics 14.

In the example of FIG. 3, cache metrics 14 includes metrics determined by the programmable switch for each application, such as a write-to-read ratio, a memory bandwidth, a hit rate, and a priority for the application. Other implementations of cache metrics 14 can include different metrics, such as a read-to-write ratio or a cache miss rate, for example.

The write-to-read ratio can be determined by, for example, identifying an operation code or message type in a packet originated by the application. Such operation codes can include an op code field in the packet indicating a write operation, read operation, or other type of operation. The programmable switch, such as through use of cache metric module 12 in FIG. 2, can calculate a write-to-read ratio for the application.

The bandwidth can be determined by an amount of data requested from and/or sent to the cache or caches associated with the programmable switch. In some implementations, the programmable switch may inspect a packet to identify a data size for a payload of the packet. Cache metric module 12 may then calculate the bandwidth for the application by adding payload sizes for packets originating from the application and dividing the sum by a period of time during which the packets were received. In other implementations, cache metrics 14 may also or alternatively indicate cache usage in a different form, such as by indicating an overall amount of data accessed in the cache by an application.

The hit rate can be determined by inspecting a packet returned from the node storing the cache to identify a field in the packet indicating a cache hit or cache miss. The cache hit indicates that data that was requested by a node was stored in the cache, while a cache miss indicates that the data requested was not stored in the cache. In some implementations, this field may be part of a custom protocol used by devices on network 100. Cache metric module 12 may calculate the hit rate for the application by dividing the number of packets with fields indicating a cache hit by a total number of packets for the application indicating cache hits and cache misses. A destination port number identified in the packet may be used to associate the cache hit and miss indications with the application. A cache module, such as cache module 26 executed by node 108 in FIG. 2, may be used by a node providing a shared cache to indicate a cache hit or a cache miss in an acknowledgment or error message sent in response to a cache request from another node. A programmable switch can then identify the cache hit or cache miss field in the acknowledgment or error message sent back to the requesting node to determine a cache hit or cache miss.

The priority of an application can be determined by identifying a priority field, such as the 802.1Q tag in an Ethernet header as part of the IEEE 802.1Qbb Priority-based Flow Control (PFC) standard. Cache metric module 12 can determine the priority of the application by associating the priority field with the source or destination port number corresponding to the application. In the example of FIG. 2 discussed above, a cache module, such as cache module 26, may be used by node 108 when sending a message to include the priority tag. The priority may indicate a particular application or class of applications, such as video applications that may require greater bandwidth and/or faster access to data than other applications.

Cache metrics 14 can be updated by the programmable switch to add new applications accessing the one or more caches associated with the programmable switch or to remove applications that have not accessed the cache during a predetermined period of time (e.g., 5 minutes). In some implementations, cache metrics 14 may include metadata or a column indicating when the cache metrics were last updated by the programmable switch to remove cache metrics for inactive applications. In some cases, the programmable switch may receive a packet from a node executing the application and inspect the packet to identify a release or completion indication indicating that the application no longer needs the cache. In such cases, the programmable switch may delete the cache metrics (i.e., a row in the example cache metrics 14 in FIG. 3) for the application.

In addition, the programmable switch may also reallocate or redistribute the memory addresses previously allocated or assigned to the inactive application or application that sent the completion. As shown in FIG. 3, each application as been allocated a portion of the cache or caches associated with the programmable switch. For example, the application with App ID 1 has been allocated memory addresses a to f, the application with App ID 2 has been allocated memory addresses g to m, the application with App ID 3 has been allocated memory addresses n to q, and the application with App ID 4 has been allocated memory addresses r to u. The memory addresses may represent ranges of physical memory used for the cache or caches by one or more nodes associated with the programmable switch (e.g., in the same server rack as the programmable switch).

Cache management module 10 of the programmable switch can use cache metrics 14 to adjust or allocate cache memory. For example, applications with a greater write-to-read ratio may be assigned a larger portion of cache memory to reduce latency if writes to a storage device (e.g., storage device 121 in FIG. 2) take disproportionately longer than reading data from the storage device. As another example, applications with a bandwidth over a particular data rate may be allocated less cache memory to prevent the application from monopolizing the cache. As another example, the programmable switch may allocate more cache memory to applications that have a higher hit rate to make more effective use of the cache memory. In addition, the programmable switch may allocate more cache memory to applications having a higher priority in cache metrics 14 to provide a higher bandwidth to such applications. In some implementations, cache management module 10 may use a weighted function for some or all of the cache metrics to allocate cache memory among applications accessing the cache.

As will be appreciated by those of ordinary skill in the art in light of the present disclosure, cache metrics 14 may include different information than shown in FIG. 3. For example, some implementations of cache metrics 14 may include a last updated column for indicating when cache metrics were last updated for applications to identify inactive applications. As another example variation, cache metrics may include other cache metrics, such as a read-to-write ratio or a cache miss rate.

Example Processes

FIG. 4 is a flowchart for a cache allocation process performed by a programmable switch according to one or more embodiments. The process of FIG. 4 may be performed by, for example, circuitry 132 of programmable switch 102 executing cache management module 10 and cache metric module 12 in FIG. 2.

In block 402, the programmable switch inspects packets to identify information related to access of a cache provided by at least one node (e.g., node 108 in FIG. 2) that is accessible to other nodes via the programmable switch. The identified information may include, for example, at least one of a port number indicating an application accessing the cache, a priority tag (e.g., an 802.1Q tag), an operation code indicating an operation to be performed in the cache (e.g., write operation or read operation), an indication of a cache hit or a cache miss, and/or a data size of a payload of the packet. The inspection may be performed by, for example, a parser of the programmable switch that extracts or identifies headers or fields in a packet received by the programmable switch. In some implementations, match action stages of the programmable switch may then evaluate the parsed headers or fields to identify the information related to the cache.

In block 404, the programmable switch determines one or more cache metrics based on the information identified in block 402. The cache metrics can include, for example, priorities associated with different applications accessing the cache, a write-to-read ratio or read-to-write ratio for an application, memory bandwidths for different applications accessing the cache, and/or indication of cache hit rates or cache miss rates for different applications accessing the cache. In some implementations, a cache metric module (e.g., cache metric module 12 in FIG. 2) may determine the cache metrics in block 404 by associating the information identified in block 402 with particular applications by using a source port number or a destination port number and calculating the cache metrics for an application based on information collected over a period time from packets that include the corresponding source port number or corresponding destination port number for the application.

In block 406, the programmable switch allocates at least a portion of the cache to at least one application based on the cache metrics determined in block 408. In some implementations, cache management module 10 may use the cache metrics to determine an amount or address range of available cache memory to allocate to an application. During operation, the cache management module may adjust the allocations of cache memory to different applications based on updated cache metrics, inactivity of an application, release of cache memory by an application, or a message from network controller 120 indicating an adjustment to the allocation of the distributed cache.

In block 408, the programmable switch sends the cache metrics determined in block 404 to network controller 120 or to a different programmable switch. The sending of cache metrics may occur periodically to update distributed cache metrics 20 stored by network controller 120. In implementations where the cache metrics are shared with other programmable switches, such as an aggregated switch 104 or other ToR switch 102, the other programmable switch may update some or all of its cache metrics based on the received cache metrics.

The collection of cache metrics from throughout network 100 can ordinarily enable network controller 120 to provide dynamic management of a distributed cache to adjust for changing workloads and accommodate for nodes or other devices in network 100 that may become unavailable. The sharing of cache metrics among different programmable switches and network controller 120 can also better tailor the allocation of cache memory to different applications executing on different nodes in network 100. For example, if a server rack 101 has unused cache memory, network controller 120 may allocate the unused cache memory to an application executing at a node in a different server rack that may otherwise not have enough cache memory available in its own server rack.

Those of ordinary skill in the art will appreciate with reference to the present disclosure that the order of blocks for the cache allocation process of FIG. 4 may differ in other implementations. For example, in other implementations, the order of blocks 406 and 408 may be switched so that the determined cache metrics are sent to the network controller or a different programmable switch before allocating at least a portion of the cache. In yet other implementations, block 408 may be omitted.

Figure 5:
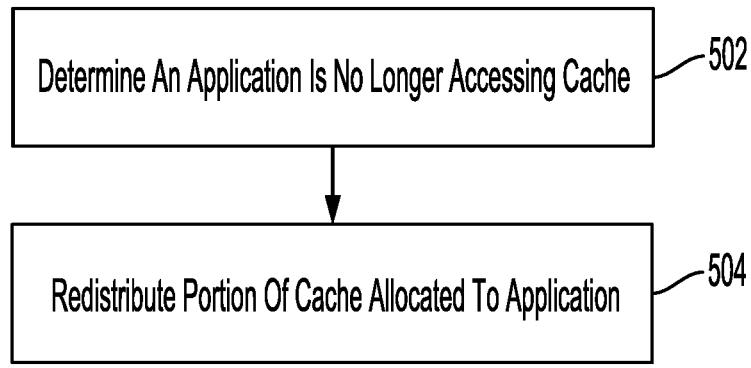
FIG. 5 is a flowchart for a cache redistribution process according to one or more embodiments.

FIG. 5 is a flowchart for a cache redistribution process according to one or more embodiments. The process of FIG. 5 may be performed by, for example, circuitry 132 of programmable switch 102 executing cache management module 10 in FIG. 2.

In block 502, the programmable switch determines that an application is no longer accessing a shared cache provided by at least one node (e.g., node 108 in FIG. 2) that is accessible to other nodes via the programmable switch. The determination may be made, for example, by cache management module 10 not having updated cache metrics 14 for the application within a predetermined period of time or not having received any packets originated from or for the application within a predetermined period of time. In other cases, the programmable switch may determine that the application is no longer accessing the cache after receiving a packet including a memory release indication from the application.

In block 504, the programmable switch redistributes a portion of the cache memory that was allocated to the application determined to no longer access the cache. In redistributing the cache memory, cache management module 10 may reevaluate cache metrics 14 and/or may reallocate the portion of cache memory in the same percentages as currently allocated to other applications still accessing the cache.

Figure 6:
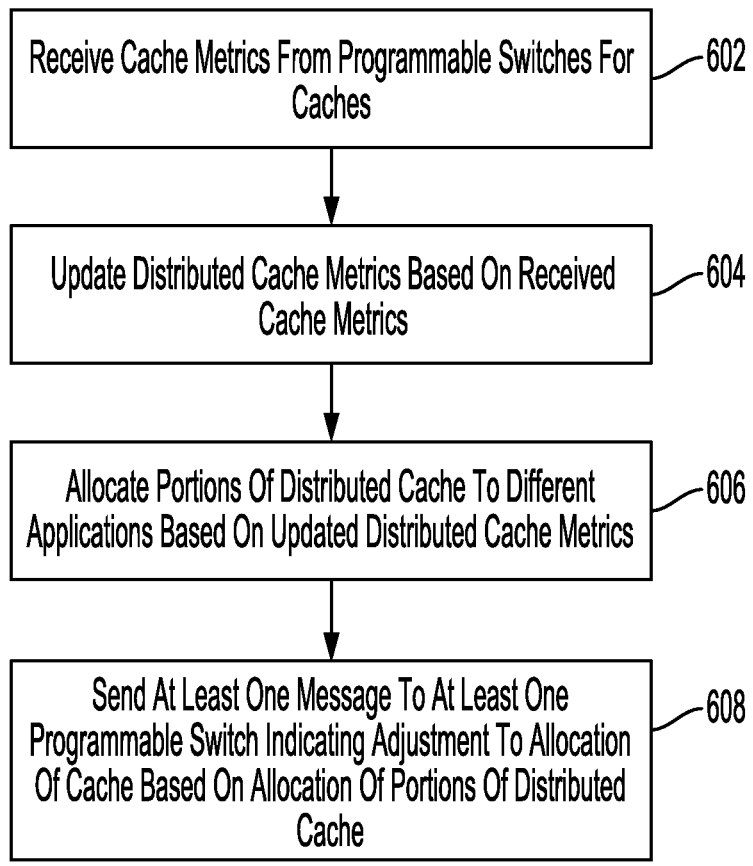
FIG. 6 is a flowchart for a cache allocation process performed by a network controller according to one or more embodiments.

FIG. 6 is a flowchart for a cache allocation process performed by a network controller according to one or more embodiments. The process of FIG. 6 may be performed by, for example, processor 124 of network controller 120 executing distributed cache management module 18 in FIG. 2.

In block 602, the network controller receives cache metrics from programmable switches for shared caches stored at nodes in network 100 that form a distributed cache. The cache metrics may include those discussed above for the example of cache metrics 14 in FIG. 3.

The network controller in block 604 updates distributed cache metrics 20 in block 604 based on the cache metrics received in block 602. In some cases, distributed cache management module 18 may aggregate or recalculate cache metrics for an application that accesses shared caches in different server racks 101. In such cases, the distributed cache metrics for a particular application represent cache metrics from received from different programmable switches. In this regard, the application may also be executed by nodes in different server racks. The distributed cache metrics maintained by the network controller may include, for example, priorities associated with different applications using the distributed cache, write-to-read ratios or read-to-write ratios for applications accessing the distributed cache, memory bandwidths or memory usage of the distributed cache by different applications, and/or cache hit rates or cache miss rates for different applications using the distributed cache.

In block 606, the network controller allocates portions of the distributed cache to different applications based on the distributed cache metrics updated in block 604. For example, distributed cache management module 18 may determine that a first application with a greater write-to-read ratio should be allocated more memory in the distributed cache than a second application with a lower write-to-read ratio. As another example, distributed cache management module 18 may determine that an application with a lower cache hit rate and higher bandwidth should be allocated more memory in the distributed cache than another application with a higher cache hit rate and lower bandwidth.

In block 608, the network controller sends at least one message to at least one programmable switch indicating one or more adjustments to the allocation of cache memory based on the allocation of portions of the distributed cache in block 606. Distributed cache management module 18 may identify the programmable switches that can redistribute or reallocate the cache memory or cache memories in their server rack 101 or in their cluster (e.g., such as for an aggregated switch 104) and send the identified programmable switches messages indicating the adjustment to the cache allocation. In some implementations, distributed cache management module 18 may also send messages to nodes executing the application or applications to notify the applications of the new locations for accessing the reallocated portions of the distributed cache. In other implementations, the programmable switches may instead notify the nodes executing the applications or application of the location of the cache memory allocated to the applications or application.

Those of ordinary skill in the art will appreciate with reference to the present disclosure that the order of blocks for the cache allocation process of FIG. 6 may differ in other implementations. For example, in some implementations, cache metrics may be received in block 602 and the distributed cache metrics may be updated in block 604 multiple times before an allocation of the portions of the distributed cache takes place in block 606.

As discussed above, the use of in-line programmable switches and/or a network controller as a centralized point for determining cache metrics and allocating cache memory improves the coherency of the cache allocations and can provide for a more effective usage of a distributed cache. By adjusting cache allocations among different applications or programs during runtime, it is ordinarily possible to tailor use of the distributed cache to the actual workloads and needs of applications.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or a System on a Chip (SoC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A programmable switch, comprising:
    a plurality of ports configured to communicate with a plurality of nodes via a network including at least one node providing a cache accessible by other nodes, wherein the at least one node and the programmable switch are separate devices; and
    circuitry configured to:
        inspect packets received via the plurality of ports to identify information related to access of the cache;
        determine, based on the identified information, one or more cache metrics for-different applications indicating their usage of the cache; and
        send the one or more determined cache metrics to a network controller to update network cache metrics received by the network controller from a plurality of programmable switches for different caches shared on the network, wherein the received network cache metrics are determined by the plurality of programmable switches for different applications indicating their usage of the different caches shared on the network.

2. The programmable switch of claim 1, wherein the identified information includes at least one of a port number indicating an application accessing the cache, a priority tag, an operation code indicating an operation to be performed in the cache, an indication of a cache hit or a cache miss being returned to an application, and a data size.

3. The programmable switch of claim 1, wherein the determined one or more cache metrics further include at least one of a priority associated with an application, write-to-read ratios or read-to-write ratios for different applications accessing the cache, memory bandwidths for different applications accessing the cache, indications of cache usage by different applications accessing the cache, and indications for cache hit rates or cache miss rates for different applications accessing the cache.

4. The programmable switch of claim 1, wherein the circuitry is further configured to:
    determine that an application is no longer accessing the cache; and
    redistribute a portion of the cache that was allocated to the application to one or more other applications.

5. The programmable switch of claim 1, wherein the circuitry is further configured to send the determined one or more cache metrics to a network controller to update network cache metrics received by the network controller from a plurality of programmable switches for different caches shared on a network.

6. The programmable switch of claim 1, wherein the circuitry is further configured to send the determined one or more cache metrics to a different programmable switch to update cache metrics determined by the different programmable switch.

7. The programmable switch of claim 1, wherein the circuitry is further configured to:
    update the one or more cache metrics based on new information identified in new packets received via the plurality of ports; and
    adjust an allocation of the at least a portion of the cache to the at least one application based on the updated one or more cache metrics.

8. The programmable switch of claim 1, wherein the at least one application is executed by multiple nodes.

9. The programmable switch of claim 1, wherein the programmable switch is an aggregated switch or a Top of Rack (ToR) switch.

10. A method performed by a programmable switch, the method comprising:
    inspecting packets received by the programmable switch to identify information related to access of a cache at a node in communication with the programmable switch, wherein the node and the programmable switch are separate devices that communicate via a network;
    determining one or more cache metrics for the cache based on the identified information, wherein the one or more cache metrics are for different applications indicating their usage of the cache; and
    sending the one or more determined cache metrics to a network controller to update network cache metrics received by the network controller from a plurality of programmable switches for different caches shared on the network, wherein the received network cache metrics are determined by the plurality of programmable switches for different applications indicating their usage of the different caches shared on the network.

11. The method of claim 10, wherein the identified information includes at least one of a port number indicating an application accessing the cache, a priority tag, an operation code indicating an operation to be performed in the cache, an indication of a cache hit or a cache miss being returned to an application, and a data size.

12. The method of claim 10, wherein the determined one or more cache metrics include at least one of a priority associated with an application, write-to-read ratios or read-to-write ratios for different applications accessing the cache, memory bandwidths for different applications accessing the cache, indications of cache usage by different applications accessing the cache, and indications of cache hit rates or cache miss rates for different applications accessing the cache.

13. The method of claim 10, further comprising:
    determining that an application is no longer accessing the cache; and
    redistributing a portion of the cache that was allocated to the application to one or more other applications.

14. The method of claim 10, further comprising allocating portions of the cache to the different applications based on the determined one or more cache metrics.

15. The method of claim 10, further comprising sending the determined one or more cache metrics to a different programmable switch to update cache metrics determined by the different programmable switch.

16. The method of claim 10, further comprising:
updating the one or more cache metrics based on new information identified in new packets received by the programmable switch; and
adjusting an allocation of the portions of the cache to the different applications based on the updated one or more cache metrics.

17. The method of claim 10, wherein the different applications are executed by different nodes on the network.

18. The method of claim 10, wherein the programmable switch is an aggregated switch or a Top of Rack (ToR) switch.

19. A network controller for a network including a distributed cache formed of a plurality of caches at a plurality of nodes on the network, the network controller comprising:
at least one memory configured to store distributed cache metrics for the distributed cache, wherein the distributed cache metrics are for different applications that access the distributed cache;
an interface configured to communicate with a plurality of programmable switches; and
a processor configured to:
receive cache metrics from the plurality of programmable switches for the plurality of caches, wherein the received cache metrics are determined by the plurality of programmable switches for different applications indicating their usage of the plurality of caches;
update the distributed cache metrics based on the received cache metrics;
allocate portions of the distributed cache to the different applications based on the updated distributed cache metrics; and
send at least one message to at least one programmable switch of the plurality of programmable switches indicating an adjustment to the allocation of a cache of the plurality of caches based on the allocation of the portions of the distributed cache.

20. The network controller of claim 19, wherein the distributed cache metrics include at least one of a priority associated with an application, write-to-read ratios or read-to-write ratios for the different applications accessing the distributed cache, memory bandwidths for the different applications accessing the distributed cache, indications of cache usage by different applications accessing the distributed cache, and indications of cache hit rates or cache miss rates for the different applications accessing the distributed cache.

\* \* \* \* \*